(No Model.)  2 Sheets—Sheet 1.
J. W. RUTHERFORD.
PLOW.
No. 459,415. Patented Sept. 15, 1891.
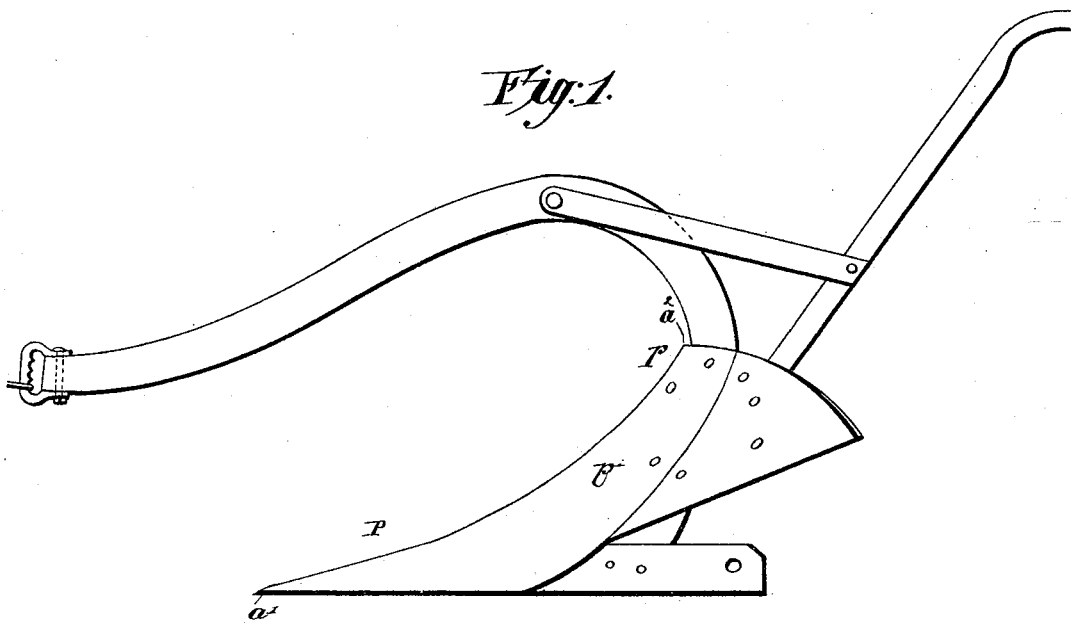
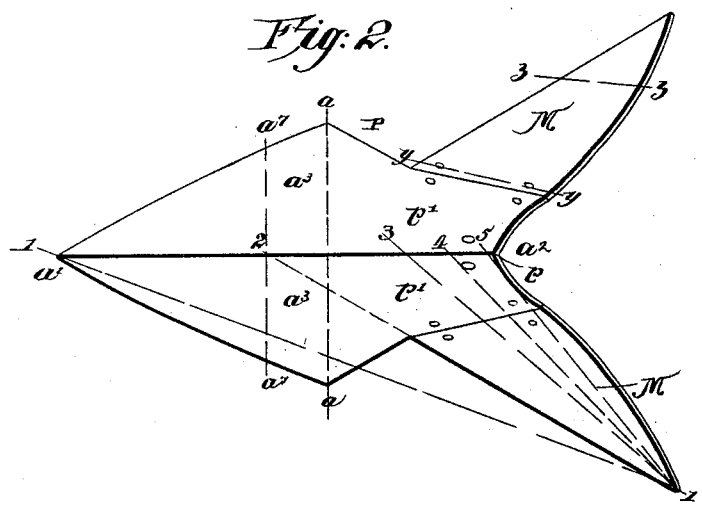
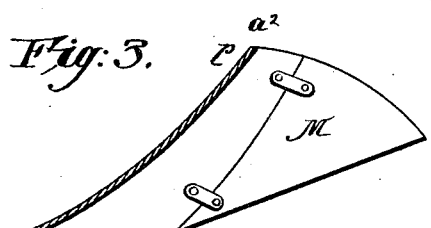
Witnesses:
H. G. Dieterich
P. W. Sommers
Inventor:
John W. Rutherford
By his Attorney:

(No Model.) 2 Sheets—Sheet 2.

J. W. RUTHERFORD.
PLOW.

No. 459,415. Patented Sept. 15, 1891.

Witnesses:
H. F. Dieterich
R. W. Sommers

Inventor:
John W. Rutherford
By his Attorney:

UNITED STATES PATENT OFFICE.

JOHN W. RUTHERFORD, OF HONEY GROVE, TEXAS.

PLOW.

SPECIFICATION forming part of Letters Patent No. 459,415, dated September 15, 1891.

Application filed April 22, 1891. Serial No. 390,004. (No model.)

*To all whom it may concern:*

Be it known that I, JOHN W. RUTHERFORD, a citizen of the United States, residing at Honey Grove, in the county of Fannin and State of Texas, have invented certain new and useful Improvements in Plows; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to double-mold-board plows, and has for its object a construction whereby the resistance to the passage of the plow through the soil is greatly diminished, thereby producing a plow of what is called "light draft," and whereby the soil is thoroughly broken up as it is turned over. It is well known that certain soils—as, for instance, what is known as the "black lands of Texas"—stick so tenaciously to the plow that the slice turned over is but imperfectly broken up, if at all, and that a very great power is required to draw the plow through such soil. Many attempts have been made to overcome these difficulties; but so far as I am aware they have proven unsuccessful. After a thorough practical experience with the plow which forms the subject-matter of this invention these difficulties are found to be effectually overcome. Not only is the power necessary to draw the plow through the soil materially lessened, in fact not appreciably greater than in plowing ordinary land, but the slices turned over are thoroughly broken up.

The invention consists in structural features, as will now be fully described, reference being had to the accompanying drawings, in which—

Figure 4:
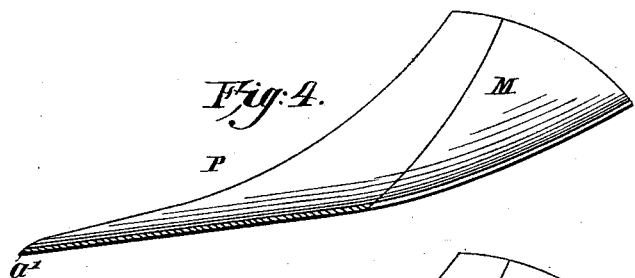
Figure 5:
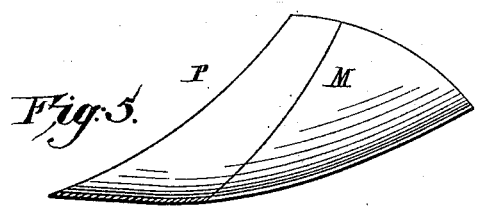
Figure 6:
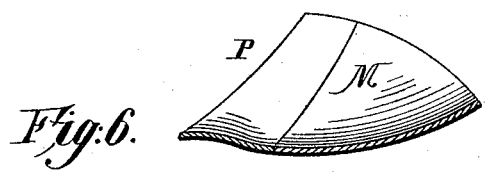
Figure 7:
Figure 8:
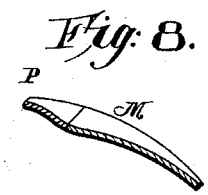
Figure 9:
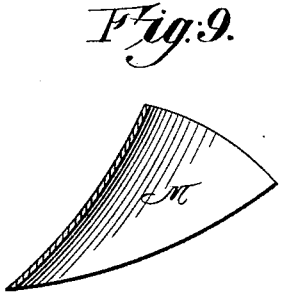
Figure 10:
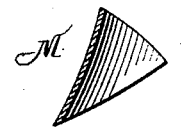

Figure 1 is a side elevation of a double-mold-board plow embodying my invention. Fig. 2 is a top plan view; Fig. 3, a longitudinal vertical section; and Figs. 4, 5, 6, 7, and 8 are sections taken on lines 1 1, 2 1, 3 1, 4 1, and 5 1 of Fig. 2. Figs. 9 and 10 are sections of one of the mold-boards taken on lines $y\ y$ and $z\ z$ of Fig. 2.

Like symbols indicate like parts in the described figures of the drawings.

The double-mold-board plow consists of the plow-point P, that has a shank $p$ formed integral therewith, and in longitudinal section has the curvature substantially as shown in Fig. 3, the greatest concavity or depth of curvature being about on line $a\ a$ drawn across the widest portion of the plow-point. From the line $a$ to the point $a'$ the curvature is very slight, while from said line $a$ to the upper end $a^2$ of the shank $p$ of the plow-point P the curvature is greater, so as to form a comparatively steep incline—say of about sixty degrees—the said curve from $a'$ to $a^2$ being a compound one composed of arcs of circles of different radii. In fact the curvature from line $a$ to point $a'$ is substantially an arc of a circle having a radius of infinite length. In cross-section the plow-point forms an obtuse-angled triangle whose reverse inclines $a^3\ a^3$ are slightly convex from the point $a'$ to about a line $a^7\ a^7$, which intersects the central line of the plow at a point intersected by the plane of the lower edges of the mold-boards. From said line $a^7\ a^7$ to line $a\ a$ the reverse inclines of the plow-point are slightly concave, while the reverse inclines of the shank $p$ are slightly convex.

M M are the mold-boards secured to the shank $p$ of the plow-point P in any usual or preferred manner. The said mold-boards have a concavo-convex form in cross-section, the curvature being such as to present the greatest concavity on the line 1 1, Fig. 4, from which point the curvature decreases gradually to line 5 1, as shown in Figs. 5, 6, 7, and 8, there being but a very slight curvature on said line 5 1, as shown in said Fig. 8. The mold-boards M are also concavo-convex in longitudinal or vertical section, the curvature or concavity being greatest along the line of the shank of the plow-point P, and from thence said curvature decreases gradually to the outer end of the mold-boards, as shown in Figs. 9 and 10.

The described construction has for its result that the plow-point will pass through the soil on a line nearly parallel with its sole, gradually raising the slice, which on reaching the wider portion of the plow-point is divided, the two slices so formed moving along the comparatively steep incline of the shank $p$. As said shank has, as described, a slightly-convex face, the slices are broken up before they reach the concavity of the mold-boards along which they travel, the path of the slices being thus made an undulating one, so that as the slice is about to be turned over it will be thoroughly broken up.

As will be seen from the drawings, the plow-point along its rear edge is wide relatively to the mold-boards, while the waist or throat between said rear edge and the mold-boards is comparatively narrow, and, as already stated, the upward inclination from the point $a'$ to said rear edge of the plow-point is very slight, so that as the slice is plowed up the lift is a gradual and slight one, and as said slice reaches the greatest lift—that is to say, a point where the greatest draft is required—it encounters the waist or throat $p'$, which is also comparatively wide, and is divided longitudinally, the two parts of the slice sliding in opposite directions onto the mold-boards, which, as shown, are set comparatively low, the lower edges of the mold-boards forming, with the rear edges of the plow-point, an obtuse angle, thus reducing the draft, and as said slices travel the undulating path along the mold-boards they are broken up.

As constructed, the lines of the plow are such as to enable it to readily pass through the soil, requiring much less power than any other plow with which I am acquainted, and it is admirably adapted for the cultivation of what is known as the "black lands of Texas."

Having thus described my invention, what I claim as new therein, and desire to secure by Letters Patent, is—

1. A double-mold-board plow comprising a plow-point provided with a shank $p$, whose reverse inclines are slightly convex from the upper end of the shank to the plow-point, in combination with two mold-boards that are concavo-convex in cross-section, for the purpose set forth.

2. A double-mold-board plow comprising a plow-point provided with a shank $p$, whose reverse inclines are slightly convex from the upper end of the shank to the plow-point, in combination with two mold-boards that are concavo-convex in cross-section as well as in longitudinal or vertical section, for the purpose set forth.

JOHN W. RUTHERFORD.

Witnesses:
R. B. RAGSDALE,
J. W. GROSS.